Oct. 12, 1971    G. B. LOKKEN    3,611,453
INVALID BED AND TILT ACTUATING MECHANISM
Filed June 25, 1970    5 Sheets-Sheet 3

INVENTOR:
GENE B. LOKKEN
BY:
Dawson, Tilton, Fallon & Lungmus
ATT'YS

Oct. 12, 1971   G. B. LOKKEN   3,611,453
INVALID BED AND TILT ACTUATING MECHANISM
Filed June 25, 1970   5 Sheets-Sheet 4

INVENTOR:
GENE B. LOKKEN
BY:
Dawson, Tilton, Falloy & Lungmus
ATT'YS

United States Patent Office 3,611,453
Patented Oct. 12, 1971

3,611,453
INVALID BED AND TILT ACTUATING
MECHANISM
Gene B. Lokken, Mishicot, Wis., assignor to American
Hospital Supply Corporation, Evanston, Ill.
Filed June 25, 1970, Ser. No. 49,673
Int. Cl. A61g 7/00
U.S. Cl. 5—62
26 Claims

ABSTRACT OF THE DISCLOSURE

An invalid bed in which movement of a patient-supporting frame into Trendelenburg and reverse Trendelenburg positions is achieved by buckling one of the scissors or connecting frames upon which the patient-supporting frame rests. Buckling of such connecting frame is normally prevented by at least one butterfly arm pivotally carried by one of the longitudinal members of such frame, the arm normally engaging the end of the frame's other longitudinal side member to maintain such members in alignment. A release bar extending through one of such frame members is engageable with an extension of the butterfly arm to pivot such arm into a releasing position, thereby permitting relative pivotal movement of the frame members. Automatic shifting of the release bar into its retracted position occurs as the frame members pivot out of alignment so that the butterfly arm, which is biased into a locking position, will again lock such members together when they have returned to aligned condition.

BACKGROUND

Beds with scissors mechanisms for lifing and lowering patient-supporting frames are disclosed in co-pending co-owned applcations Ser. No. 1,222, filed Jan. 7, 1970 and Ser. No. 49,672, filed June 25, 1970. As brought out in such applications a scissors mechanism has a number of advantages over other lift mechanisms used in power-operated hospital beds, such advantages including simplicity and strength.

SUMMARY

The present invention is concerned with a relatively simple and highly effective structure for actuating the reverse Trendelenburg (or Trendelenburg) function of such a bed. In brief, the lifting mechanism of the bed includes a pair of connecting or scissors frames having their upper ends engaging the patient-supporting frame and their lower ends engaging the base frame. One of the scissors frames is unitary and rigid; the other scissors frame is composed of two sections pivotally connected together for relative movement about a transverse pivot line. Locking elements in the form of pivotal locking arms are provided for normally maintaining the two sections in longitudinal alignment; however, when either Trendelenburg or reverse Trendelenburg adjustment is desired, the sections of the second connecting frame are pivoted one way or the other with respect to each other. As the second connecting frame buckles in a controlled and gradual manner, the patient-supporting frame tips or tilts into a Trendelenburg or reverse Trendelenburg position.

The sections of the second connecting frame include longitudinal frame members, the longitudinal frame members of one section having end portions which terminate alongside the longitudinal frame members of the other section. The locking arms are pivotally secured to the undersides of the longitudinal members of the second section and are normally urged into locking positions in which they engage the undersides of the end portions of the first-mentioned longitudinal members. Such engagement prevents relative pivotal movement of the two frame sections in one direction. However, when the arms are swung into their releasing positions, their ends clear the end portions of the first-mentioned frame members, thereby permitting the buckling action which results in a tilting of the patient-supporting frame.

Movement of the locking arms into their releasing positions is achieved by a release bar which extends through the interior of one of the hollow frame members and which is shiftable axially into engagement with an extension of one of the locking arms. A connecting rod extends from one locking arm to the other and coordinates their movement. When the release bar is urged axially to pivot the locking arms into their releasing positions, the bar is itself temporarily latched in an extended condition; however, as buckling of the frame sections thereafter occurs, the latched bar is automatically released and returns to its original position to permit re-locking of the frame sections when they again shift into alignment.

Figure 1:
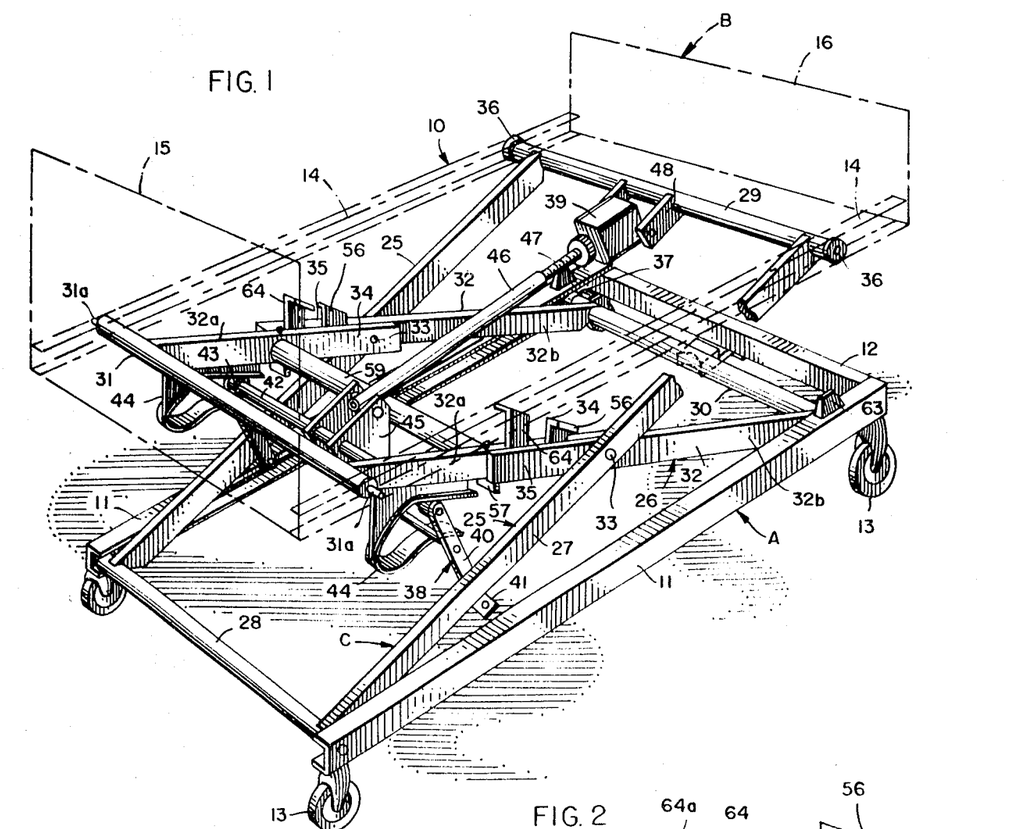
FIG. 1 is a perspective view of the main operating elements of a hospital bed with a portion of one scissors frame broken away, and the entire patient-supporting frame being illustrated in phantom, for clarity of illustration.
Figure 4:
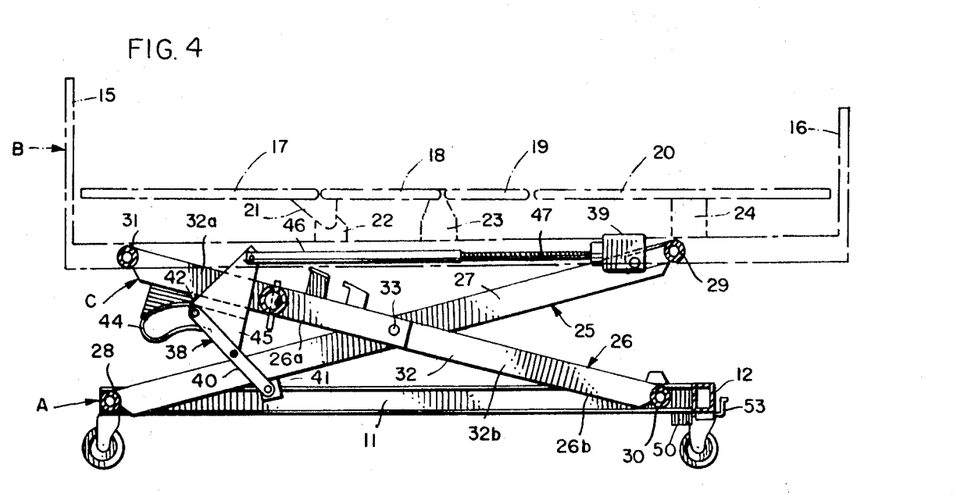
FIG. 4 is a longitudinal sectional view taken along approximately the longitudinal mid line of the bed and illustrating the bed as it approaches a fully raised position.
Figure 5:
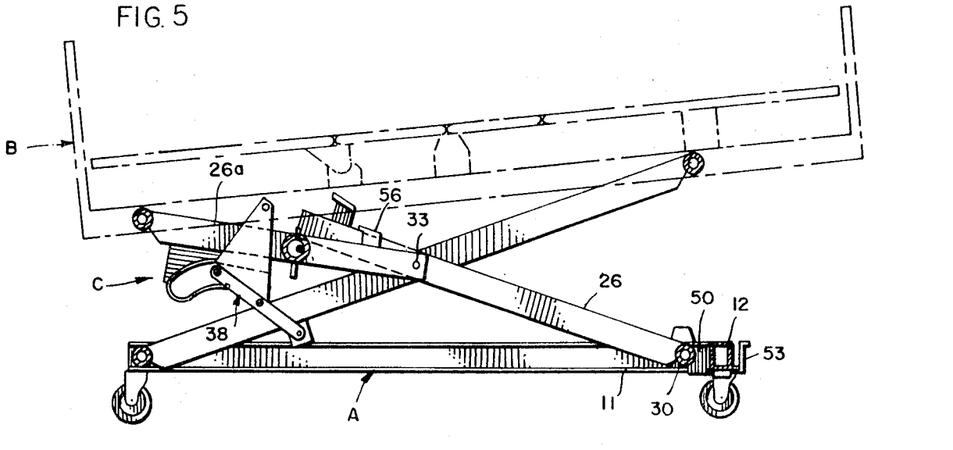
FIGS. 5 through 7 are sectional views similar to FIG. 4 but illustrating the bed in Trendelenburg, fully lowered, and reverse Trendelenburg positions, respectively.
Figure 6:
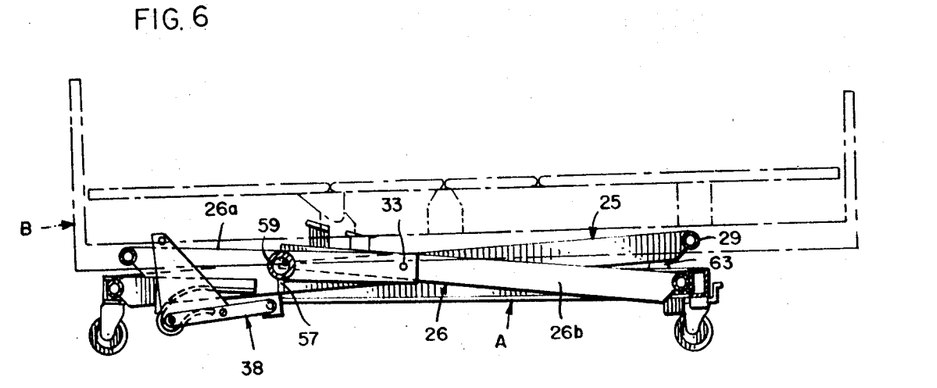
Figure 7:
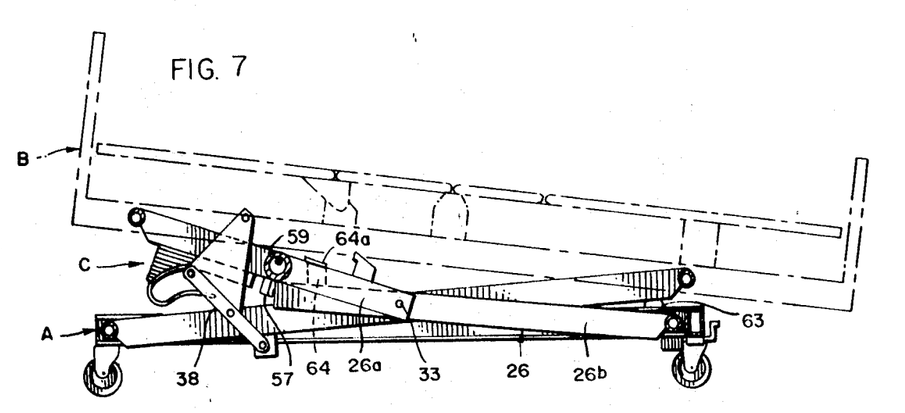
Figure 10:
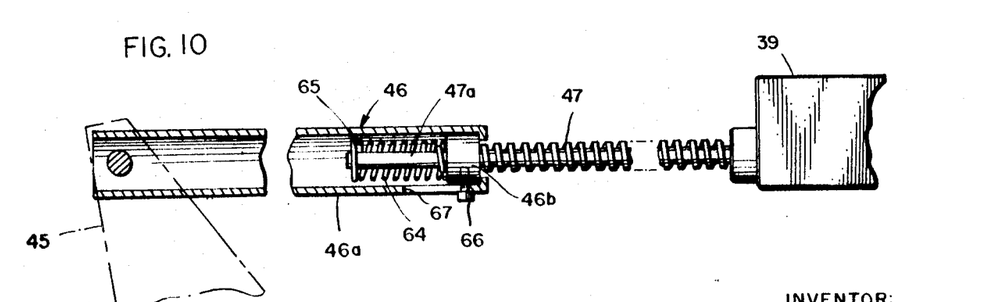
FIG. 10 is a fragmentary sectional view showing internal construction of the screw-drive assembly.

For clarity of illustration, the motor and screw-drive mechanism for operating the bed, although shown in FIGS. 1, 4, and 10, are omitted from FIGS. 5–7. It is to be understood, however, that such components are part of the embodiment represented in all views. In addition, and as brought out more fully hereinafter, the patient-supporting frame is illustrated in phantom so that its presence will not obscure the scissor mechanism to which this invention is primarily directed.

DESCRIPTION

Referring to the drawings, the numeral 10 generally designates a power-operated hospital bed having a base frame A, a patient-supporting frame B, and an intermediate scissors mechanism C. In the illustration given, the base frame A is generally U-shaped in configuration, having a pair of parallel side frame members 11 and an end frame 12. It will be observed that the side frame members 11 are of C-shaped cross section, having inwardly-facing channels for guiding movement of a scissors frame as the scissors mechanism extends and retracts. At each of its four corners, the base frame is equipped with conventional swivel casters 13.

The patient-supporting frame B normally extends along a horizontal plane and is therefore usually disposed in parallel relation with respect to base frame A. Like the base frame, the patient-supporting frame has a pair of inwardly-facing channel frame members 14 extending longitudinally along opposite sides thereof. Head and foot panels 15 and 16 are provided at opposite ends of frame B. Mattress-supporting panels 17–20, illustrated in FIGS. 4–7 but omitted from FIG. 1 to avoid unnecessary complication of the latter view, constitute part of the patient-supporting frame and are carried by supporting members 21, 22, 23 and 24. While a patient-supporting frame similar to the structure disclosed in the aforementioned copending application has been illustrated here, it is to be understood that any suitable patient-supporting frame may be provided as long as it is equipped with side channels 14 which cooperate with the scissors mechanism. Thus, the size and arrangement of mattress-supporting panels, the mounting of those panels, the means for adjusting such panels into varying positions, constitute no part of the present invention. Since conventional elements may be used in that regard, further description is believed unnecessary herein.

Scissors mechanism C comprises a pair of scissors frames 25 and 26. Each scissors frame is generally rectangular in configuration, frame 25 having a pair of spaced parallel side frame members 27 and a pair of end frame members 28 and 29. While scissors frame 26 similarly has a pair of end frame members 30 and 31, each of its side frame members 32 is composed of upper and lower sections 32a and 32b. As a result, scissors frame 26 is as a whole divided into upper and lower sections 26a and 26b. In the illustration given, the upper and lower sections of the scissors frame 26 are connected by pivots 33 for relative pivotal movement about the same transverse axis about which the respective scissors frames 25 and 26 pivot. Also, it will be observed that there is substantial overlap between the side members of scissors frame 26; that is, frame members 32b extend upwardly beyond the pivots so that the respective members 32a and 32b have portions 34 and 35 in laterally-displaced or side-by-side relation.

To permit proper scissors action resulting in movement of the patient-supporting frame B between raised and lowered positions, certain ends of the scissors frames must be pivotally connected to the base and patient-supporting frames and other ends of the scissors frames must be slidably or movably connected thereto. In the context of this application, the term "sliding movement" is intended to mean translatory movement of one part relative to another and is therefore to be understood as including members which shift longitudinally upon each other even though frictional resistance may be reduced by means of rollers.

In the embodiment illustrated in the drawings, the lower end member 28 of scissors frame 25 is pivotally connected to the side members 11 of the base frame A. The opposite or upper end of the scissors frame 25 is equipped with rollers 36 (FIG. 1) which travel in the channels 14 of the patient-supporting frame B. Similarly, the upper end member 31 of scissors frame 26 is provided with laterally projecting pivots 31a which are rotatably received in openings in the side members 14 of the patient-supporting frame whereas the lower end of scissors frame 26 is equipped with rollers 37 (FIG. 1) which ride in the channels defined by the side members of base frame A. As the scissors mechanism is retracted horizontally (or extended vertically) to raise the patient-supporting frame, the ends of the scissors frames adjacent the head end of the bed pivot while the opposite ends of the respective scissors frames slide or shift longitudinally towards the bed's head end. Conversely, when the scissors mechanism extends horizontally (or retracts vertically) to lower the bed, the rollers 36 and 37 of the respective scissors frames travel in channels 14 and 11 towards the foot end of the bed.

Operation of the scissors mechanism is achieved by drive means which, in the particular embodiment illustrated, comprises a lever assembly 38 and a motor 39. The lever assembly includes a pair of lever arms 40 which have their lower ends pivotally secured to the side members of scissors frame 25 intermediate end member 28 and pivot shaft 33. Preferably, to increase the length of the lever arms, each side member 27 of scissors frame 25 is provided with depending projections 41 to which the lower ends of the lever arms are pivotally secured.

The upper ends of the parallel lever arms are secured together by transverse shaft 42, the shaft extending beneath the upper section of scissors frame 26 and being equipped with rollers 43 (FIG. 1) which ride along the surfaces of cam members 44. As shown most clearly in FIGS. 1 and 4, each cam 44 comprises a guide member mounted along the underside of one of the members 32a of the upper section of scissors frame 26. The underside of each guide member defines a cam surface which extends longitudinally of the scissors frame, then slopes downwardly and forwardly away from that frame, and finally reverses in direction, curving upwardly and rearwardly with respect to such frame. The distinctive configuration of each cam surface results in a bed which will raise or descend at substantially constant speed throughout its entire range of vertical movement. In addition, the reverse curvature of the cam surfaces at the front ends thereof assures that the lever assembly will remain in proper engagement with the cams even when the bed is fully lowered (FIG. 6).

The lever assembly is operatively connected to motor 39 by means of a pair of upstanding plates 45 which serve as a clevis and which are connected at their upper ends to an internally threaded tube assembly 46. Such assembly comprises a tube 46a equipped with a nut 46b (FIG. 10). The nut threadedly receives the threaded drive shaft 47 of the reversible motor 39, the motor in turn being mounted upon end member 29 of scissors frame 25 by means of a pair of supporting brackets 48. Therefore, as motor 39 operates to rotate threaded shaft 47 in one direction, the cooperative action between the lever assembly and the cam assembly causes the scissors mechanism to contract and lift the patient-supporting frame B into the raised position illustrated in FIGS. 1 and 4, whereas rotation of the shaft in the opposite direction causes the scissors mechanism to expand and lower the patient-supporting frame into the fully lowered position illustrated in FIG. 6.

The bed will now be described with specific reference to the structure responsible for shifting the patient-supporting frame into the Trendelenburg position illustrated in FIG. 5. As previously mentioned, raising and lowering of the bed is accompanied by horizontal movement of end member 30 along side frame members 11 of base frame A. In other words, if the bed were to be lowered from the raised position illustrated in FIG. 4, end member 30 would slide or shift towards the foot end of the bed as the scissors mechanism expands. To achieve a Trendelenburg position, means are provided to block such rearward translation of end member 30, thereby causing a buckling of scissors frame 26 about shaft 33 as the lever assembly 38 continues to pivot downwardly.

Figure 8:
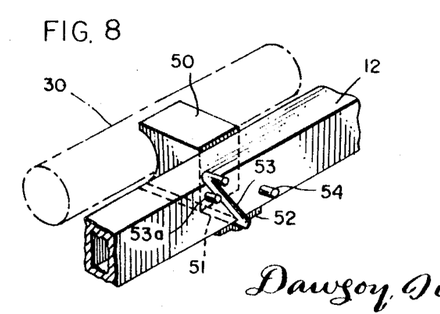
FIG. 8 is a fragmentary perspective view illustrating the scissors frame blocking means in operative condition.

Referring to FIG. 8, it will be observed that the rear member 12 of base frame A supports a blocking member 50, the blocking member having a curved forward surface which conforms to the contour of end member 30 of scissors frame 26 when the blocking member is in the operative position shown. A shaft 51 extends horizontally (and longitudinally of the bed) beneath frame member 12 and is rotatably mounted thereon by means of a bracket 52. The front portion of the shaft is secured to the underside of the blocking member to one side of the vertical mid plane thereof. At its rear end, the shaft 51 extends upwardly and outwardly to define an operating handle 53.

Figure 9:
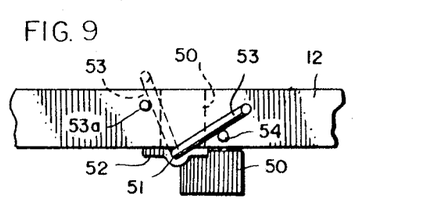
FIG. 9 is a fragmentary end elevational view showing the blocking means in inoperative position.

The position of the block illustrated in FIG. 8 is not a stable one, even though the handle engages stop 53a, because of the off-center support provided by shaft 51. Therefore, unless the block is restrained against tipping movement, it will swing by its own weight into the lowered or inoperative position illustrated in solid lines in FIG. 9. In that position, the block is disposed at a level beneath the path of travel of end member 30 of scissors frame 26. A projection 54 engages handle 53 and normally holds the blocking assembly in the inoperative position shown in FIGS. 9 and 4.

Starting from the raised position of the bed illustrated in FIG. 4, if an operator wishes to shift the bed into the Trendelenburg position of FIG. 5 then handle 53 is simply swung into the raised position illustrated in FIGS. 5 and 8 (and in broken lines in FIG. 9) to position blocking member 50 in the path of movement of end member 30 as the bed begins to descend. Blocking member 50 therefore prevents further rearward movement of end member 30 and, consequently, prevents further lowering of the rear or foot end of the bed. However, since scissors frame 26 is jointed, continued downward movement of lever assembly 38 permits the forward or second section 26a of the scissors frame 26 to pivot downwardly about shaft 33 (FIG. 5).

The extent of downward pivotal movement of scissors frame section 26a is controlled by a suitable limit switch (not shown) which simply interrupts operation of motor 39. A pair of stop members 56 mounted on portions 34 of scissors frame members 32a are engageable with portions 35 of frame members 32b to positively limit the extent of downward buckling of the scissors frame 26 should any failure in the operation of the limit switch occur.

Movement of the bed out of the Trendelenburg position of FIG. 5 is accomplished simply by reversing the steps described above; that is, the motor 39 is reversed to cause upward pivoting of lever arm assembly 38 to raise scissors frame section 26a and, when the two sections of scissors frame 26 are in planar alignment, to cause elevation of the patient-supporting frame into the fully raised position of FIG. 4. Because of the off-center mounting of blocking member 50, movement of end member 30 away from the blocking member results in automatic movement of the blocking member into the inoperative position of FIG. 9.

Upward buckling of scissors or connecting frame 26 as the bed shown in FIG. 1 is raised is normally prevented by releasable locking means in the form of pivotal butterfly arms 57. As shown most clearly in FIG. 2, each butterfly arm comprises a plate element disposed beneath the second or upper section 32a of each side frame member 32 of scissors frame 26. An upstanding shaft 58 supports each butterfly arm for rotational or pivotal movement about a generally vertical axis. In normal locking position, each butterfly arm has a wing or end portion 57a disposed beneath the upper end portion 35 of frame section 32b (FIG. 1), thereby preventing independent upward movement of upper section 32a.

Figures 2, 3:
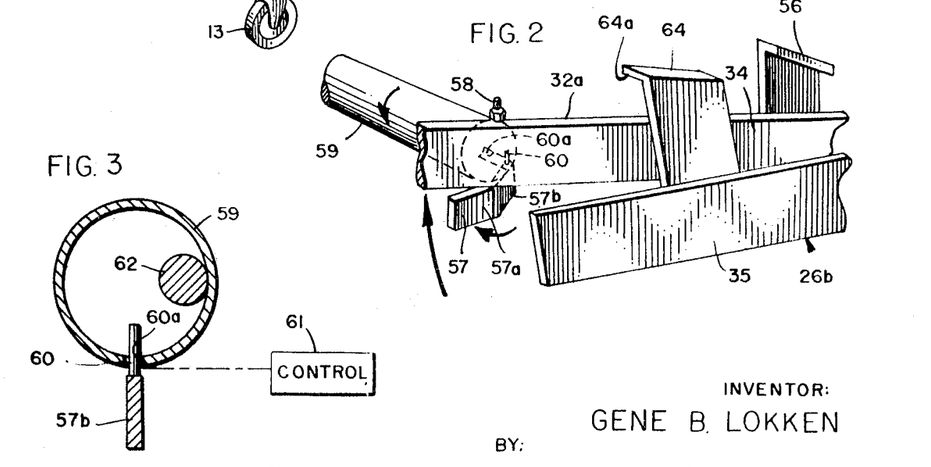
FIG. 2 is a fragmentary perspective view illustrating the releasable locking mechanism for the scissors frames.
FIG. 3 is an enlarged and detailed sectional view showing the locking and release mechanisms.

In the construction shown in FIGS. 1–7, synchronized operation of the butterfly arms on opposite sides of the bed is achieved by means of a transverse tube or cylinder 59 extending between frame member sections 32a and rotatably mounted thereon. As the tube is rotated in a counterclockwise direction (as viewed in FIGS. 1–3), pins 60, which project upwardly from wing portions 57b of the butterfly arms and which are received in longitudinal slots 60a in tube 59, are urged towards the foot end of the bed to pivot such arms and withdraw wing portions 57a from the lower surfaces of members 32b of the split scissors frame 26 (FIG. 2). Such rotational movement of the tube may be achieved by any suitable control means 61 such as, for example, an operating cable connected to the tube, such cable being retracted either manually or electrically, as by means of a solenoid. A return force to urge the tube and the butterfly arms back into their original positions may be conveniently provided by simply weighting the tube with a suitable internal weight 62 (FIG. 3). It is to be understood, however, that any suitable means for urging the tube into its original position and for swinging the butterfly arms into their normal locking positions may be provided.

FIGS. 6 and 7 illustrate the steps for shifting the bed into a reverse Trendelenburg position. As the patient-supporting frame moves towards its fully lowered position, the upper end of scissors frame 25—that is, the end of the frame adjacent end member 29—engages upwardly-projecting stop members 63 mounted upon base frame A. Such engagement occurs before the lever assembly 38 has completed its descent. Consequently, continued downward travel of the lever assembly permits the upper or second sections 26a of scissors frame 26 to pivot downwardly about the axis of shaft 33 while the first or lower section of that frame is held stationary. A slight downward buckling of scissors frame 26 occurs. As illustrated in FIG. 6, such buckling is slight; in fact, the head end of the patient-supporting frame drops only an inch or less lower than the foot end of that frame. However, such buckling is enough to lower the butterfly arms 57 out of contact with the side members of scissors frame section 26b. By manipulating or energizing control 61, an operator may thus rotate tube 59 to swing the butterfly arms away from the end of scissors frame section 26b so that when motor 39 is reversed to pivot lever assembly 38 upwardly, the butterfly arms will clear the end of scissors frame section 26b and will therefore permit upward buckling of scissors frame 26 as illustrated in FIG. 7.

The extent of such upward buckling action is limited by stop members 64. Such members, illustrated most clearly in FIGS. 1, 2, and 7, are secured to the side members of scissors frame section 26b and have inwardly projecting terminal portions 64a which extend into the path of movement of scissors frame section 26a and which engage the top surfaces of side members 32a to lock the sections of scissors frame 26 against further buckling action.

FIG. 7 illustrates the bed in its full reverse Trendelenburg position. It is to be noted, however, that the inclined position will be maintained even if the driving motor is operated to continue the lifting action of lever assembly 38. In other words, if the lever assembly is lifted towards the vertical from the position shown in FIG. 7, the patient-supporting frame will move upwardly without changing the angle of inclination shown.

The bed is shifted from reverse Trendelenburg position into its normal horizontal position by simply reversing the steps described. As the bed returns to its fully lowered position of FIG. 6, the butterfly arms clear the ends of frame members 32b and automatically swing into their original locking positions (FIG. 1) under the influence of weighted tube 59.

It will be observed from FIG. 10 that threaded drive shaft 47 has an unthreaded terminal portion 47a. Normally nut 46b does not run off of the threads and onto the unthreaded terminal portion, even when the bed is in the fully lowered position of FIG. 6, because a limit switch (not shown) interrupts operation of the motor 39 when that position is achieved. However, should there ever be a failure in the operation of the switch resulting in a running-on of the motor 39 after the bed is fully lowered, damage to the drive mechanism (as by buckling of the drive tube assembly 46) and other components of the bed will be avoided because the nut will simply ride the slight additional distance necessary to carry it off of the end of the threaded portion of shaft 47 and onto the unthreaded terminal portion 47a where it will remain until the operation of the motor is reversed and the force of helical compression spring 64 (interposed between nut 46b and terminal flange 65 of shaft 47) will cause it to re-engage the threads of the shaft. Relative rotation between nut 46b and the tube 46a is prevented by a stud or guide pin 66 which is affixed to the nut and which projects radially through longitudinal guide slot 67 in the tube wall. Therefore, the nut may move longitudinally within the tube, to the limited extent permitted by the slot and stud, until it becomes unthreaded from the shaft, thus preventing damage which might otherwise occur should the limit switch fail.

Referring now to FIGS. 11–15, bed 10 is shown equipped with butterfly arms 57' which function in a manner similar to previously-described arms 57 to lock scissors frame 26 against buckling action until it is desired to tilt the patient-supporting frame into a reverse Trendelenburg position. However, the structure of FIGS. 11–15 differs from the one already described with respect to the means for urging the butterfly arms into their locking positions, the means for coordinating or synchronizing the operation of the locking arms, and the control means for shifting such arms to actuate the reverse Trendelenburg function. Except for those differences and for slight differences in the construction of the butterfly arms themselves, all as hereafter described, the bed 10 and its operation are identical to the construction of FIGS. 1–10.

As in the previously-described construction, the butterfly arms are pivotally carried by shafts 58 secured to upper frame sections or members 32a. In their normal locking positions, the arms have the upper surfaces of their outer wing portions 57b disposed beneath the ends of frame members or frame sections 32b. A plate 100 is welded or otherwise secured to the outer wing portion of that butterfly arm 57' operationally associated with release bar 105, such plate having a portion 100a projecting upwardly from the wing portion to form an upward extension thereof and having a lower portion 100b extending downwardly beneath the wing portion.

Figure 11:
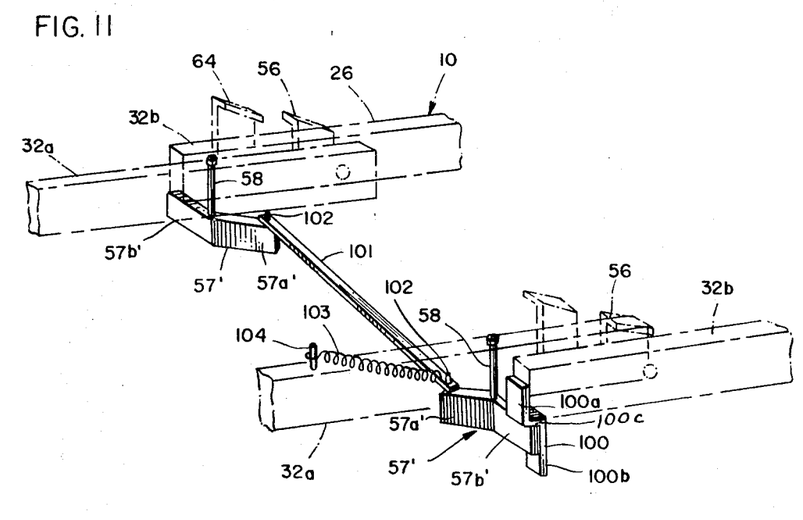
FIG. 11 is a perspective view of a locking mechanism embodying the invention.

Movement of the butterfly arms 57' is synchronized or coordinated by a transversely-extending connecting rod 101. As shown in FIG. 11, the connecting rod has apertures at its ends which pivotally receive the upstanding pins 102 of butterfly arms 57'. Biasing means in the form of tension spring 103 extends between one of the pins 102 and a suitable attachment 104 on one of the frame members 32a to urge the interconnected butterfly arms into their locking positions.

Figure 12:
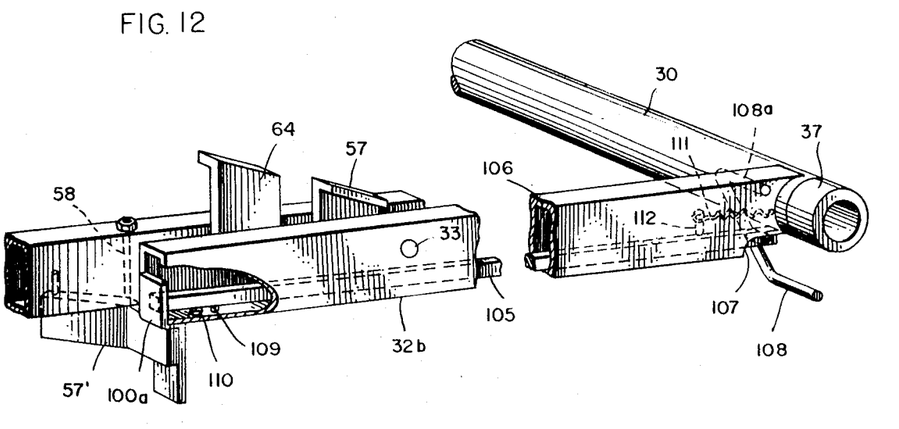
FIG. 12 is a perspective view showing a portion of the locking mechanism of FIG. 11 in combination with the means for releasing that mechanism.

It will be observed from FIG. 12 that at least one of the frame members or frame sections 32b is hollow and is open at its upper end. A release bar 105 extends through the cavity or passage 106 of member 32b, the upper end of the bar normally being substantially flush with the open upper end of the frame member. The lower end portion of the release bar 105 is exposed through an opening 107 at the lower end of the hollow frame member and a control handle 108 is linked to the exposed lower end of the bar and is pivotally connected to the frame member for shifting the release bar axially within the frame member.

When handle 108 is swung to the left (as viewed in FIG. 12) about the axis of its upper pivot portion 108a, release bar 105 is urged axially into engagement with the upstanding extension 100a of butterfly arm 57', thereby causing the butterfly arm to pivot about its mounting shaft 58. Latching means in the form of pin 109 and opening 110 serve to hold the release bar temporarily in its extended position. As soon as the extended upper end portion of the bar is lifted to withdraw pin 109 from the recess or opening 110, return means in the form of tension spring 111 pulls the release bar back into its retracted position. As shown in FIG. 12, spring 111 extends between end member 30 and an upstanding pin 112 projecting from the release bar.

Figure 13:
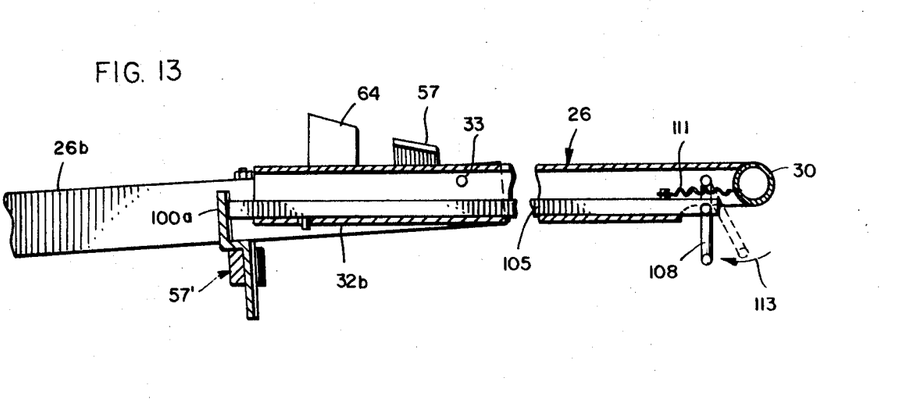
FIGS. 13–15 are fragmentary vertical sectional views showing the relationship between the locking and releasing mechanism of FIGS. 11–12 in three different stages of operation.
Figure 14:
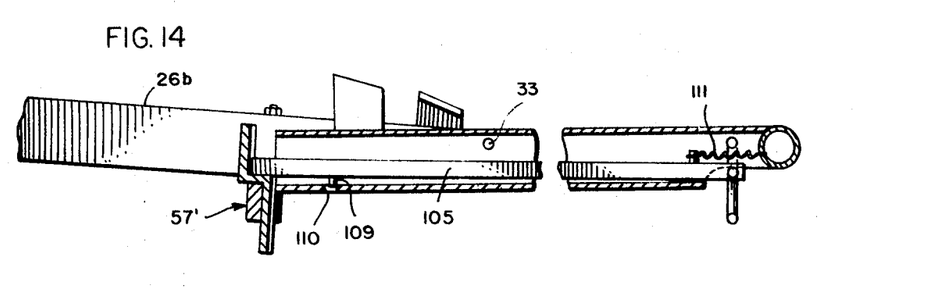
Figure 15:
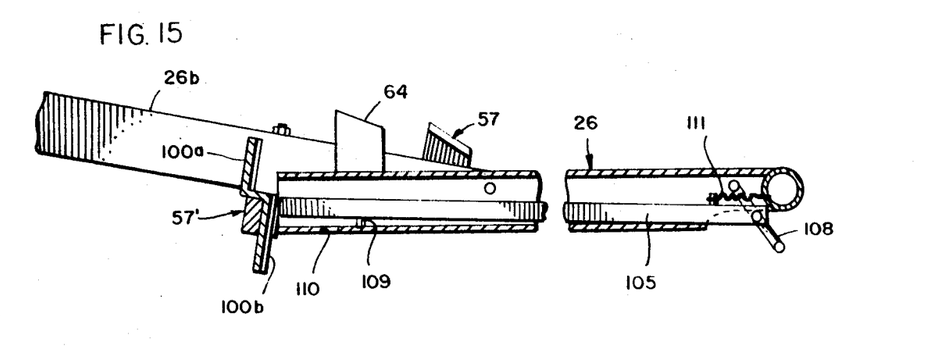

Operation of the control and locking means is illustrated in FIGS. 13–15. To release the locking arms 57', an attendant may first shift the bed into a fully lowered position (as previously described in connection with FIG. 6) to produce a slight reverse buckling of scissors frame 26 and thereby lower the butterfly arms 57' out of forceful supporting engagement with the undersurfaces of frame members 32b. Alternatively, disengagement of the butterfly arms 57' from frame members 32b may be achieved by starting with the bed in fully raised position, then shifting the blocking member 50 into operative position, and then lowering the bed until it starts to go into a Trendelenburg position. Thereafter, the operator urges handle 108 towards the head end of the bed, in the direction indicated by arrow 113, to shift the release bar 105 into an extended position and to pivot each butterfly arm into the releasing position shown in FIG. 13. When the driving motor 39 is then energized to lift the upper section 26b of scissors frame 26, butterfly arms 57 clear the open upper ends of frame members 32b. However, as shown in FIG. 14, the butterfly arm 57' does not clear the projecting end of release bar 105. As the scissors or connecting frame section 26b pivots upwardly about the axis of shaft 33, surface or shoulder 100c engages the protruding end of the release bar to lift the free end of the bar and to withdraw latch pin 109 from its recess 110. As soon as the pin is extracted from the recess, spring 111 is operative to retract the release bar into its original position (FIG. 15). Consequently, when the bed is later shifted from a reverse Trendelenburg position back into a horizontal position, spring 103 will be operative to re-position the butterfly arms in their locking positions. Subsequent energizing of the motor to raise the bed will result in a normal horizontal lifting of the patient-supporting frame B assuming, of course, that the operator does not again shift handle 108 forwardly to swing the butterfly arms into their releasing positions.

FIG. 15 illustrates the relationship of parts before the bed has reached its full reverse Trendelenburg position. Since further buckling action of scissors frame 26 is possible, the depending skirt or extension 100b of the butterfly arm serves a protective function in assuring that the release bar 105 cannot be accidently moved forward to engage below the locking arm 57 when the scissors frame 26 is buckled to the maximum extent allowed by stop member 64, with the result that release bar 105 would become wedged beneath locking arm 57 when the bed is returned to a horizontal position.

While a structure embodying the invention has been disclosed in considerable detail in the foregoing specification and drawings, it will be understood that many of those details may be varied without departing from the spirit and scope of the invention.

What is claimed is:

1. An invalid bed having normally parallel base and patient-supporting frames, and an elevating mechanism therebetween including a pair of connecting frames engaging the head and foot ends of said patient-supporting frame for lifting and lowering the same, one of said connecting frames having upper and lower sections pivotally joined along a transverse line for movement between aligned and buckled relation with respect to each other, said sections including pairs of longitudinal frame members having adjacent end portions in juxtaposition when said sections are aligned, one of said end portions terminating at a substantial distance from said transverse line, releasable locking means for selectively maintaining said sections in aligned relation comprising a locking arm movably mounted upon one of said frame members adjacent the termination of said one of said end portions and being movable between a locking position wherein said arm engages the other of said frame members to limit relative movement between said sections and a releasing position wherein said arm is retracted to permit such movement, and control means carried by and extending longitudinally with respect to one of said frame members for engaging and shifting said arm into its releasing position.

2. The structure of claim 1 in which means are provided for normally urging said arm into its locking position.

3. The structure of claim 2 in which said locking arm is pivotally mounted on the other of said end portions, said arm having a wing portion adapted to be positioned in the path of movement of said one end portion when said arm is in its locking position and to be displaced away from said path of movement when said arm is in said releasing position.

4. The structure of claim 3 in which said arm is mounted for pivotal movement about an axis extending in a generally vertical plane and in a direction generally perpendicular to said other of said end portions.

5. The structure of claim 4 in which said frame member providing said one end portion has a passage therethrough, said control means comprising a release bar reciprocably supported within said passage, one end of said bar normally being disposed within said passage but being extendable from said passage to engage said arm for shifting the same into said releasing position.

6. The structure of claim 5 in which said control means includes spring means for urging said bar in one axial direction to retract said one end of said bar into said passage.

7. The structure of claim 6 in which said control means includes a handle operatively associated with said bar for shifting the same into an extended position.

8. The structure of claim 7 in which said bar is also movable transversely to a limited extent within said passage, and latch means for releasably latching said bar in extended position.

9. The structure of claim 8 in which said latch means comprises a pin and recess provided by said bar and by the wall of said passage, said pin being receivable in said recess when said bar is extended.

10. The structure of claim 9 in which said pin projects downwardly, said bar being retractable into said passage under the influence of said spring when said one end thereof is lifted to disengage said pin from said recess.

11. The structure of claim 10 in which said arm has a top surface engageable with the underside of said one end portion when said arm is in its locking position, said top surface being displaced from beneath said underside when said arm is in its releasing position.

12. The structure of claim 11 in which said top surface of said arm is disposed beneath and is engageable with said one end of said bar when said one end is extended and said arm is in its releasing position for lifting said one end of said bar to unlatch the same as said sections move out of alignment.

13. The structure of claim 12 in which said arm is provided with an extension projecting upwardly beyond said top surface, said release bar being engageable with said extension to pivot said arm from a locking position into a releasing position.

14. An invalid bed having normally parallel base and patient-supporting frames, and a scissors mechanism therebetween for adjusting the elevation of said patient-supporting frame relative to said base frame, said scissors mechanism comprising a pair of crossed and pivotally-connected scissors frames having their upper ends engaging said patient-supporting frame and their lower ends engaging said base frame, one of said scissors frames having upper and lower sections pivotally joined along a transverse horizontal line for movement between aligned and buckled relation with respect to each other, said sections including pairs of longitudinal frame members having adjacent end portions in juxtaposition when said sections are aligned, one of said end portions terminating at a substantial distance from said transverse line, means for pivoting said sections about said transverse line, and releasable locking means normally restraining buckling of said one scissors frame, whereby, said patient-supporting frame is selectively shifted into Trendelenburg or reverse Trendelenburg positions by the release of said locking means and the controlled buckling of said one scissors frame, the improvement wherein said releasable locking means comprises a locking arm movably mounted upon one of said frame members adjacent the termination of said one of said end portions and being movable between a locking position wherein said arm engages the other of said frame members to limit relative movement between said sections and a releasing position wherein said arm is retracted to permit such movement, and a release bar carried by one of said frame members for limited axial movement towards and away from said locking arm, said release bar being movable into engagement with said locking arm to shift the same from its locking position to its releasing position.

15. The structure of claim 14 in which means are provided for normally urging said arm into its locking position.

16. The structure of claim 15 in which said locking arm is pivotally mounted on the other of said juxtapositioned end portions, said arm having a wing portion adapted to be positioned in the path of movement of said one end portion when said arm is in its locking position and to be displaced away from said path of movement when said arm is in its releasing position.

17. The structure of claim 16 in which said arm is mounted for pivotal movement about an axis extending in a generally vertical plane and a direction generally perpendicular to said other of said end portions.

18. The structure of claim 17 in which said frame member providing said one end portion has a passage extending therethrough, said release bar being supported within said passage, one end of said bar normally being disposed within said passage but being extendable therefrom to engage said arm for shifting the same into said releasing position.

19. The structure of claim 18 in which spring means are provided for urging said release bar in one direction to retract said one end of said bar into said passage.

20. The tsructure of claim 19 in which a handle control is operatively associated with said bar for shifting the same from a retracted to an extended position.

21. The structure of claim 20 in which said release bar is also movable transversely to a limited extent within said passage, and latch means for releasably latching said bar in its extended position.

22. The structure of claim 21 in which said latching means comprises a pin and recess provided by said bar and by the wall of said passage, said pin being receivable in said recess when said bar is in its extended position.

23. The structure of claim 22 in which said pin projects downwardly, said bar being retractable into said passage under the influence of said spring when said one end of said bar is lifted to disengage said pin from said recess.

24. The structure of claim 23 in which said arm has a top surface engagable with the underside of said one of said juxtapositioned end portions when said arm is in its locking position, said top surface of said arm being displaced from beneath said underside of said one end portion when said arm is in its releasing position.

25. The structure of claim 24 in which said top surface of said arm is disposed beneath and is engageable with said one end of said bar when said one end is extended and said arm is in its releasing position for lifting said one end of said bar to unloach the same as said sections move out of alignment.

26. The structure of claim 25 in which said arm is provided with an extension projecting upwardly beyond said top surface, said release bar being engageable with said extension to pivot said arm from a locking position into a releasing position as said release bar is extended.

References Cited

UNITED STATES PATENTS

| | | | |
|---|---|---|---|
| 2,445,258 | 7/1948 | Beem | 5—62 UX |
| 2,833,587 | 5/1958 | Saunders | 5—63 X |

JAMES C. MITCHELL, Primary Examiner

U.S. Cl. X.R.

5—63; 108—8